US011438757B2

(12) United States Patent
Chauhan et al.

(10) Patent No.: US 11,438,757 B2
(45) Date of Patent: Sep. 6, 2022

(54) SYSTEM AND METHOD OF RESOURCE ALLOCATION

(71) Applicant: JIO PLATFORMS LIMITED, Ahmedabad (IN)

(72) Inventors: Devesh Chauhan, Mumbai (IN); Veera Sai Satyanarayana Prasad Marni, Mumbai (IN); Abhilash Shrivastava, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 127 days.

(21) Appl. No.: 16/918,947

(22) Filed: Jul. 1, 2020

(65) Prior Publication Data
US 2021/0006963 A1 Jan. 7, 2021

(30) Foreign Application Priority Data
Jul. 1, 2019 (IN) .............................. 201921026177

(51) Int. Cl.
*H04W 8/18* (2009.01)
*H04W 76/28* (2018.01)
(Continued)

(52) U.S. Cl.
CPC .......... *H04W 8/183* (2013.01); *H04B 17/336* (2015.01); *H04L 1/0026* (2013.01);
(Continued)

(58) Field of Classification Search
CPC ... H04W 8/183; H04W 68/005; H04W 76/28; H04W 84/042; H04W 60/005; H04W 76/16; H04W 72/1273; H04W 24/10; H04W 68/02; H04W 72/1231; H04W 72/1257; H04W 88/06; H04B 17/336; H04L 1/0026; H04L 1/1819;
(Continued)

(56) References Cited

U.S. PATENT DOCUMENTS

2013/0267267 A1* 10/2013 Mujtaba ............ H04W 36/0085
455/509
2015/0334740 A1* 11/2015 Yang ..................... H04L 1/1812
370/329

(Continued)

*Primary Examiner* — Sharmin Chowdhury
(74) *Attorney, Agent, or Firm* — Klarquist Sparkman, LLP

(57) ABSTRACT

A system and method to provide identification of the Tune Away in DSDS device, wherein identification of such Tune Away in DSDS device and mitigation of such Tune Away is done by Aperiodic CQI, Hybrid Automatic Repeat Request (HARQ) and Pro-Active scheduling based on periodicity and duration of Tune Away to minimize HSI degradation in DSDS devices. This disclosure provides improved throughput for network subscriptions in multi-SIM, multi-RATs wireless devices by preventing downlink scheduling in Tune Away periods and minimize radio resource wastage occurring due to DSDS UEs as well as improving HSI performance in such UEs by preventing lower layer retransmissions and conserve radio resources that are wasted in carrying those retransmissions earlier. The disclosure increases throughput performance for the data session in a DSDS device ecosystem and prevent substantial decline in average throughput experienced at DSDS UE.

13 Claims, 10 Drawing Sheets

(51) Int. Cl.
    *H04W 68/00*      (2009.01)
    *H04L 1/00*      (2006.01)
    *H04L 1/18*      (2006.01)
    *H04L 5/00*      (2006.01)
    *H04B 17/336*      (2015.01)
    *H04W 84/04*      (2009.01)

(52) U.S. Cl.
    CPC .......... *H04L 1/1819* (2013.01); *H04L 5/0055* (2013.01); *H04W 68/005* (2013.01); *H04W 76/28* (2018.02); *H04W 84/042* (2013.01)

(58) Field of Classification Search
    CPC ... H04L 5/0055; H04L 1/1664; H04L 1/1678; H04L 5/0057; H04L 5/003; H04L 1/1812
    See application file for complete search history.

(56) References Cited

U.S. PATENT DOCUMENTS

| | | | |
|---|---|---|---|
| 2019/0082346 A1* | 3/2019 | Tang | H04B 7/0626 |
| 2020/0146054 A1* | 5/2020 | Jeon | H04L 5/0053 |
| 2020/0351818 A1* | 11/2020 | Park | H04W 4/90 |

* cited by examiner

SYSTEM AND METHOD OF RESOURCE ALLOCATION

CROSS REFERENCE TO RELATED APPLICATIONS

This application claims priority to Indian Patent Application No. 201921026177, filed on Jul. 1, 2019, the disclosure of which is hereby incorporated by reference in its entirety.

TECHNICAL FIELD

The technical field generally relates to the field of wireless communication systems, and more particularly, to a system and method of resource allocation.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today a widely deployed wireless network, in order to provide various communication services such as voice, video, data, advertisement, content and messaging broadcasts, etc., usually comprises multiple access networks and support communications for multiple users by sharing the available network resources.

One example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 5 and beyond. Unlike HSPA, Long Term Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third-generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development also continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

In recent years, there has been recorded an immense growth of multi-SIM wireless devices ecosystem, because of the adaptability they provide for voice and data services simultaneously, particularly in countries where there are many service providers. For example, the smart-phone/user devices with multi-SIM technologies, allows a user to implement different plans or service providers on the same smartphone, each with separate mobile numbers. Another advantage is that this multi-SIM device allows the user with getting a new SIM card, during travel outside the operating zones, so users can obtain local SIM cards and pay local call rates in those zones or targeted destination country. Further, by using multiple SIMs, a user can take advantage of different pricing plans for data and voice and therefore can save on voice and data usage. Thus, dual-SIM wireless devices effectively provide users with two phones, without the need to carry two separate devices. Around this time, OEMs also began to explore options in a UE with two antennas on the Rx path. In parallel, devices also evolved from single SIM solutions to multi-SIM solution. This led to the development of DSDS (Dual SIM Dual Standby) solutions where the user equipment (UE) has capabilities to receive network page on second SIM slot when there is activity on-going in the first SIM.

A DSDS User Equipment (UE) can only support one active radio connection i.e. only one SIM can have a connection with the Network while other remains on standby. The DSDS mobile devices have only one radiofrequency (RF) module and only one baseband (BB) module, that can be shared by the two Subscriber Identities Modules (SIMs) in Idle Discontinuous Reception (Idle-DRX) mode. These UEs, therefore consume less battery power compared to a design with two active transceivers. Therefore, as soon as a SIM is active (for signaling with the network, or for voice call or packet transfer, for example), the other SIM becomes out of range with respect to the network, typically leading to missed calls on said another SIM. The DSDS UEs will be active only towards (at most) one network (or for one SIM) at any time and will only monitor paging and carry out mobility management in the other network. The gaps in the use of the radio transceiver by a first radio access control unit shall arise if the second radio access control unit needs to listen for signaling messages during such paging indication occasion. The paging cycle is configured by the radio access network node. The paging cycle length also depends on the radio access technology. Idle mode paging cycles in GSM can be configured from any of the following permissible values: GSM—471, 706, 942, 1177, 1412, 1648, 1883, 2118 milliseconds (ms).

Further, although the existing technologies have provided various solutions for managing resource allocation to overcome problems relating to performance degradation in multi sim user devices/DSDS devices, but these currently known solutions have many limitations and therefore there is a need in the art for improvement in this area of technology.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a method and system of resource allocation. Another object of the present disclosure is to manage physical downlink shared channel (PDSCH) resource allocation in a multi-SIM user device. Another object of the present invention is to identify Tune Away in dual SIM dual standby (DSDS) devices and mitigation of such Tune Away by Aperiodic CQI based solution to further minimize high-speed internet (HSI) degradation in DSDS devices. Yet another object of the present invention is to mitigate the identified Tune Away by Hybrid Automatic Repeat Request (HARQ) based solution in order to further minimize HSI degradation in DSDS devices. Yet another object of the present invention is to mitigate the identified Tune Away by Pro-Active scheduling based on periodicity and duration of Tune Away, which further results into a minimization of HSI degradation in DSDS devices. Yet another object of the present invention is to provide improved throughput for network subscriptions in multi-SIM, multi-active wireless devices by preventing downlink scheduling in Tune Away periods. Also, another object of the present invention is to provide an automatic mechanism that aims at minimizing radio resource wastage occurring due to DSDS UEs as well as improving HSI performance in such UEs. Also, one more object of the present invention is to prevent lower layer retransmissions from happening and conserve radio resources that are wasted in carrying those retransmissions earlier. Another object of the present invention is to provide increased throughput performance for the data session in a DSDS device ecosystem and to prevent a substantial decline in average throughput experienced at UE. Yet another object of the present invention is to benefit end-users by neutralizing the adverse effect of DSDS limitation and rendering better HSI experience. Yet another object of the present invention is to provide a device ecosystem that provides a seamless enhancement of data session in multi-SIM, multi-active wireless devices. Yet another object of the present invention is to provide solution for data session continuity for multi-SIM devices in multi-RAT network with proposed solutions for DSDS devices specification. Also, one another object of the present invention is to provide multi-SIM devices to enable service operators to efficiently provide data services via existing device ecosystem that will help in meeting this data services demand with the current device ecosystem. Yet another object of the present invention is to provide service network operators a profitable business proposition through enhanced data service using proposed solutions to keep the user hooked to the higher data throughput. Yet another object of the present invention is to provide transparency in switching to all available RATs that is to say that the smart data switch will work independently of whether the device is 4G/3G/EV-Do/eHRPD capable technology.

In order to achieve the aforementioned objectives, the present invention provides a method and system of resource allocation. A first aspect of the present invention relates to a method for managing resource allocation in a multi-SIM user device comprising at least a first subscriber identity module (SIM) and a second subscriber identity module (SIM). The method comprising identifying, via an identification unit, in physical downlink shared channel (PDSCH), at least one discontinuous transmission (DTX) event associated with the second SIM of the multi-SIM user device. Thereafter, the method leads to detecting, via a detection unit, at least tune away gap based on the identified at least one discontinuous transmission (DTX) event and a comparison of at least one uplink signal-to-interference-plus-noise ratio (SINR) value of the second SIM with a pre-determined decision-making threshold value. Further, the method encompasses adjusting, via a scheduler unit, at least one PDSCH resource allocation of the second SIM, wherein the adjusting, via a scheduler unit, at least one PDSCH resource allocation comprises one of a suspending the at least one PDSCH resource allocation of the second SIM and restricting the at least one PDSCH resource allocation of the second SIM. Thereafter, the method detects via a processing unit, one of a first event and a second event in response to said adjustment of the at least one PDSCH resource allocation. Further, the method encompasses resuming, via the scheduler unit, the at least one PDSCH resource allocation of the second SIM based on the detection of the one of the first event and the second event.

Another aspect of the present invention relates to a system for managing resource allocation in a multi-SIM user device comprising at least a first subscriber identity module (SIM) and a second subscriber identity module (SIM). The system comprising an identification unit, configured to identify, in the physical downlink shared channel (PDSCH), at least one discontinuous transmission (DTX) event associated with the second SIM of the multi-SIM user device. Further, the system comprises a detection unit, configured to detect, at least tune away gap based on the identified at least one discontinuous transmission (DTX) event and a comparison of at least one uplink signal-to-interference-plus-noise ratio (SINR) value of the second SIM with a pre-determined decision-making threshold value. The system thereafter comprises a scheduler unit, configured to adjust, at least one PDSCH resource allocation of the second SIM, wherein to adjust, the at least one PDSCH resource allocation the scheduler unit is further configured to suspend or restrict the at least one PDSCH resource allocation of the second SIM. Further, the system comprises a processing unit, configured to detect, one of a first event and a second event in response to said adjustment of the at least one PDSCH resource allocation. Thereafter, the scheduler unit is further configured to resume the at least one PDSCH resource allocation of the second SIM based on the detection of the one of the first event and the second event.

Yet another aspect of the present invention relates to a base station for managing resource allocation in a multi-SIM user device comprising at least a first subscriber identity module (SIM) and a second subscriber identity module (SIM). The base station comprising an identification unit, configured to identify, in the physical downlink shared channel (PDSCH) at least one discontinuous transmission (DTX) event associated with the second SIM of the multi-SIM user device. Further, the base station comprises a detection unit, configured to detect, at least tune away gap based on the identified at least one discontinuous transmission (DTX) event and a comparison of at least one uplink signal-to-interference-plus-noise ratio (SINR) value of the second SIM with a pre-determined decision-making threshold value. The base station further comprises a scheduler unit, configured to adjust, at least one PDSCH resource allocation of the second SIM, wherein to adjust, the at least one PDSCH resource allocation the scheduler unit is further configured to suspend or restrict the at least one PDSCH resource allocation of the second SIM. Thereafter, the base station comprises a processing unit, configured to detect, one of a first event and a second event in response to said adjustment of the at least one PDSCH resource allocation. Further, the scheduler unit is further configured to resume the at least one PDSCH resource allocation of the second SIM based on the detection of the one of the first event and the second event.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
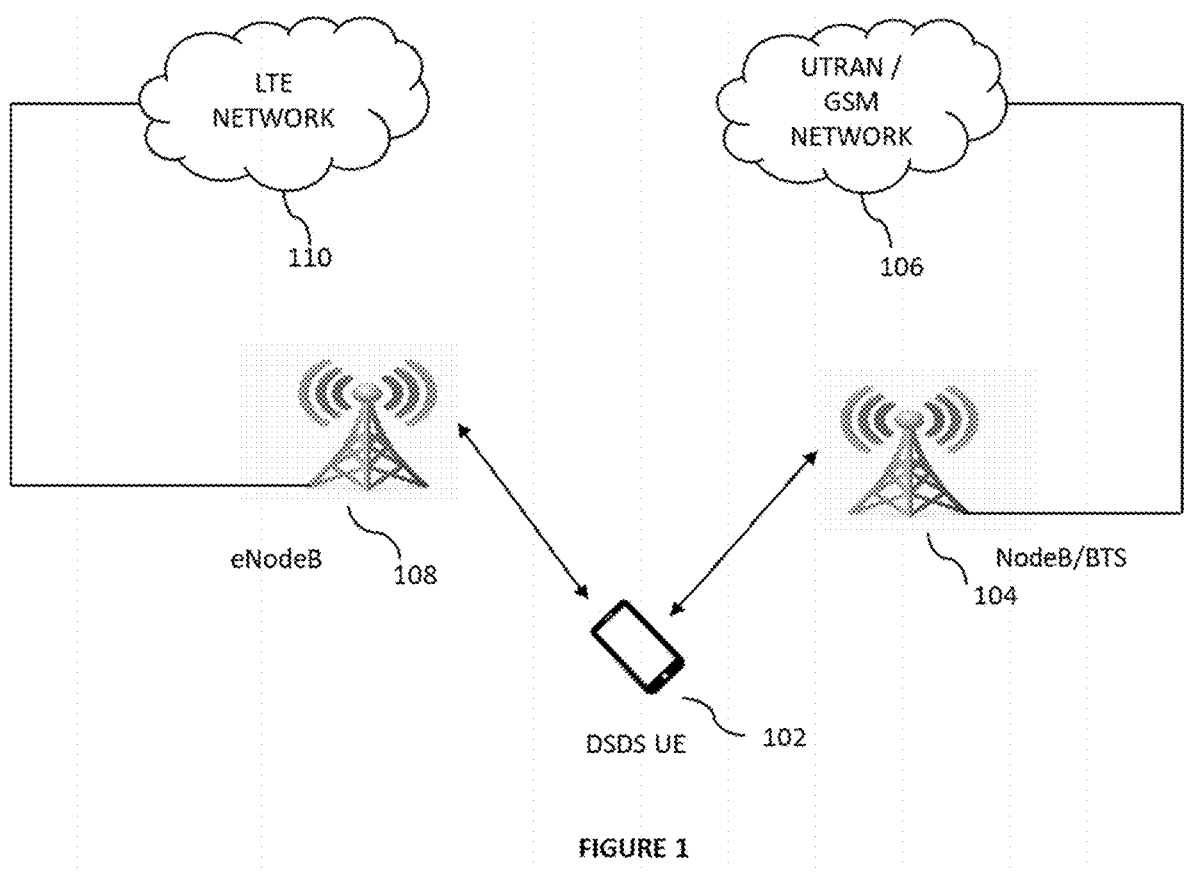
FIG. 1 illustrates an exemplary network architecture diagram indicating latching of a DSDS UE with two different radio access technologies (RATs), in accordance with exemplary embodiments of the present invention.

The foregoing shall be more apparent from the following more detailed description of the disclosure.

DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station", "user device", "mobile subscriber station," "access terminal," "terminal," "handset," and similar terminology refer to a multi-SIM user device for instance a DSDS user device, utilized by a subscriber or user of a wireless communication service to receive and/or convey data associated with voice, video, sound, and/or substantially any data-stream or signaling-stream. Further, the foregoing terms are utilized interchangeably in the subject specification and related drawings.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

The terms "wireless communications site", "base station", "network entity", "Network", "Node B," "evolved Node B" (eNodeB)), and the like are utilized interchangeably in the subject specification and drawings and refer to devices that can receive and transmit signal(s) from and to wireless devices, or act as a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

As used herein, a "transmitter unit" may include at least one transmitter unit configured to transmit at least one data and/or signals to one or more destinations in order to implement the features of the present disclosure. The transmitter unit may also be configured to process the at least one data and/or signal. The transmitter unit may further include, any other similar units obvious to a person skilled in the art, required to implement the features of the present invention.

As used herein, a "receiver unit" may include at least one receiver unit configured to receive at least one data and/or signals from one or more sources in order to implement the features of the present disclosure. The receiver unit may also be configured to process the at least one data and/or signal. The receiver unit may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

As used herein, an "identification unit" may be an intelligent unit having an analyzing, a transmitting, a receiving, a computing and an identifying capability, and/or the identification unit may be any other such similar unit configured to implement the features of the present disclosure and is obvious to a person skilled in the art.

As used herein, a "detection unit" may be an intelligent unit having an analyzing, a transmitting, a receiving, a computing, a comparing and a detecting capability, and/or the detection unit may be any other such similar unit configured to implement the features of the present disclosure and is obvious to a person skilled in the art.

As used herein, a "scheduler unit" may be an intelligent unit having an analyzing, a transmitting, a receiving, a computing, an adjusting, a suspending, a restricting, a resuming and a scheduling capability, and/or the scheduler unit may be any other such similar unit configured to implement the features of the present disclosure and is obvious to a person skilled in the art.

As discussed in the background section that an immense growth of multi-SIM wireless devices ecosystem is recorded over the recent years, therefore an increase in various limitations is also recorded in this area of technology. Furthermore, the existing problems associated with these multi-SIM wireless devices (UEs) are further explained as below:

The time duration for which UE switches its radio to another RAT to listen to necessary signaling is termed as Tune Away Gap and it may range from 5 ms to 125 ms.

Owing to single active radio, the DSDS design has the following limitations:

1. Case 1: Whenever the user receives or makes a call on one SIM on first Radio Access Technology (RAT) network (for instance, on a GSM RAT network), the UE shall switch its radio i.e., tune away to GSM and the other SIM on second RAT (for instance, on an LTE RAT eNodeB), shall get abruptly broken. Thus, for an ongoing data download session on LTE SIM, Down-Link (DL) transmission from eNodeB will get interrupted. Further, the resulting DL packet acknowledgements which are supposed to go in the uplink (UL) will not get transmitted from the UE and therefore are not received at the eNodeB which is expecting the packets it had transmitted. The LTE eNodeB can only abort data scheduling for this UE once eNodeB detects radio link failure (RLF).

2. Case 2: During the idle period, the UE (i.e. DSDS user device) needs to listen to the paging indicator on both SIMs latched on different LTE Network and GSM Network respectively. When it switches the radio, i.e., tunes away to listen to GSM signalling (paging, system acquisition, network selection, etc.), the radio link with LTE eNodeB gets abruptly broken and as a result of which the DL transmission from eNodeB to the UE is not received at the UE similar to the GSM call case as discussed above. The resulting DL packet acknowledgements will also be not received at the eNodeB.

3. Case 3: The gap duration gets more severe (1.1 seconds) when SIM 2 falls in the "Out of Coverage" scenario. This triggers SIM 2 module to periodically search for its Home Public Land Mobile Network (HPLMN) which forces the UE to tune away from Primary SIM carrier for 1.1 seconds every T second, where T is the HPLMN selection timer which is Network vendor implementation-specific. This will considerably impact ongoing HSI (High-speed Internet) services on the primary carrier.

The occurrence of Case 1 above is aperiodic in nature while Case 2 and Case 3 are of periodic nature. The paging occasions responsible for tune away gaps in Case 2 have well-defined periodicity governed by paging cycle configured in the network. The time duration for which UE switches its radio to another RAT to listen to necessary signaling as discussed above is termed as Tune Away Gap and it may range from 5 ms to 125 ms in this case. The Tune Away Gaps induced by all three cases enlisted above may cause either one or all of the following irregularities on the LTE module of the device:

i) The UE will not be able to decode physical downlink control channel (PDCCH) messages i.e., PDCCH erasures in DL and thus may fail to acquire any DL/UL grants during each gap.

ii) The UE may not be able to send acknowledgement/negative-acknowledgement (ACK/NACK) in the uplink for some of the physical downlink shared channel (PDSCH) sub-frames triggering retransmissions from the eNodeB in the downlink, also some of which may be discarded by the UE as discarded transmissions. Such ACK/NACK erasures can be interpreted at the eNodeB as DTX from the UE.

iii) The UE may report NACK instead of ACK for some PDSCH sub-frames decoded successfully leading to redundant retransmissions.

Since network entity/eNodeB does not have knowledge of the Tune Away events, it continues to assign radio resources to the UE and in turn detects Discontinuous Reception (DTX) and NACKs in uplink for the downlink data transmitted towards the UE during Tune Away. This results in radio resource wastage. The adverse effects enlisted above prevail post Tune Away duration as well, till all retransmissions are acknowledged by the UE. The Hybrid Automatic Repeat Request (HARQ) retransmissions due to DSDS Tune Away instances result in high Block Error Ratio (BLER) levels, defined as the ratio of the number of erroneous blocks received to the total number of blocks sent, resulting in a substantial decline in average throughput experienced at UE.

The lower layer retransmissions due to DSDS Tune Away instances severely impacts application layer throughput. The majority of UEs have optimized their TCP stacks as they send bundled ACKs for a group of TCP packets. The loss of such acknowledgements due to Tune Away leads to a large amount of TCP re-transmissions. Hence frequent interruptions caused by periodic Tune Away instances (Case 2 and Case 3) decreases Maximum Segment Size (MSS) of TCP packets and in turn decreases average throughput. The delay in ramp-up of MSS to its peak value in subsequent TCP packets post Tune Away also contribute to a decline in average user experience throughput providing poor HSI performance experience to the user. Hence under the above conditions, a user may face buffering or stall on one SIM in a DSDS capable device and there may be situations where user can face long delays for data recovery which has the potential to degrade user experience. Therefore, at least some capabilities of a DSDS device may not be fully realized by users due to buffering delay.

Therefore, in view of these and other existing limitations, there is an imperative need to provide a solution to overcome the limitations of prior existing solutions and to provide methods and systems for managing resource allocation in a multi-SIM user device, so that the performance degradation in multi sim user devices/DSDS devices can be minimized.

The present invention provides a solution to improve network spectral efficiency and HSI performance in Dual SIM Dual Standby (DSDS) multi-SIM devices. Further, embodiments of the present disclosure may relate to a method and a system for managing resource allocation in a multi-SIM user device comprising at least a first subscriber identity module (SIM) and a second subscriber identity module (SIM). The subject invention relates to a method and a system for minimizing performance degradation in multi-SIM user devices, such as in an instance present invention provides a solution for minimizing high-speed internet (HSI) degradation in DSDS devices. The present invention facilitates identification of tune away gaps in dual SIM dual standby (DSDS) devices. Furthermore, the present invention provides a solution to mitigate such identified tune away by using at least one of an aperiodic CQI based solution, a hybrid automatic repeat request (HARQ) based solution and a pro-active scheduling of resources to the DSDS devices based on periodicity and duration of tune away gap(s). Also, the present invention provides improved throughput for network subscriptions in multi-SIM, multi-RATs wireless devices by preventing downlink scheduling in tune away periods and by minimizing radio resource wastage occurring due to DSDS UEs as well as by improving HSI performance in such UEs by preventing lower layer retransmissions and conserving radio resources that are wasted in carrying such retransmissions. Furthermore, the present invention also prevents substantial decline in average throughput experienced at the UEs. The conventional techniques do not provide an efficient way to minimize performance degradation in multi-SIM user devices. Compared to such techniques, various methods and apparatus described herein facilitate to minimize performance degradation in multi-SIM user devices by managing physical downlink shared channel (PDSCH) resource allocation in a multi-SIM user device.

Hereinafter, exemplary embodiments of the present disclosure will be described in detail with reference to the accompanying drawings so that those skilled in the art can easily carry out the present disclosure.

Referring to FIG. 1 an exemplary network architecture diagram indicating latching of a DSDS UE with two different radio access technologies (RATs), in accordance with exemplary embodiments of the present invention is shown.

As shown in FIG. 1, the dual SIM dual standby user equipment (DSDS UE) [102] is concurrently latched to a long term evolution (LTE) network [110] as well as to a legacy (UTRAN/GSM) network [106] via eNodeB [108] and NodeB/BTS [104] respectively. Therefore, FIG. 1 indicates the latching of a DSDS UE (i.e. a multi-SIM user device) [102] with two different radio access technologies (RATs). Furthermore, the wireless communication networks/network entities (i.e. the LTE network and the UTRAN/GSM network) as disclosed in FIG. 1 are exemplary and there may be some other network entities such as other legacy networks and/or next-generation 5G-New Radio (NR) networks with which the DSDS UE may be latched.

Further, the wireless communication networks with which the DSDS UE may be connected/latched, may further include a local wireless communication site (or base station), which can use a licensed radio spectrum operated and controlled by a wireless service provider. Further, said wireless communication network provides one or more services to the latched DSDS UEs. The present invention encompasses that a multi-SIM user device operated by a subscriber uses different RATs to avail the one or more services from different latched networks. The multi-SIM user device can register with the different wireless service providers and accordingly, the subscriber's communication, e.g., voice traffic, data traffic, can be routed to the subscriber of the multi-SIM user device through the base station/s of the registered wireless network/s utilizing the licensed radio spectrum. The base station can employ a backhaul network, e.g., broadband wired or wireless network backbone, to route packet communication, e.g., voice traffic, data traffic, data, to the core network.

Figure 2:
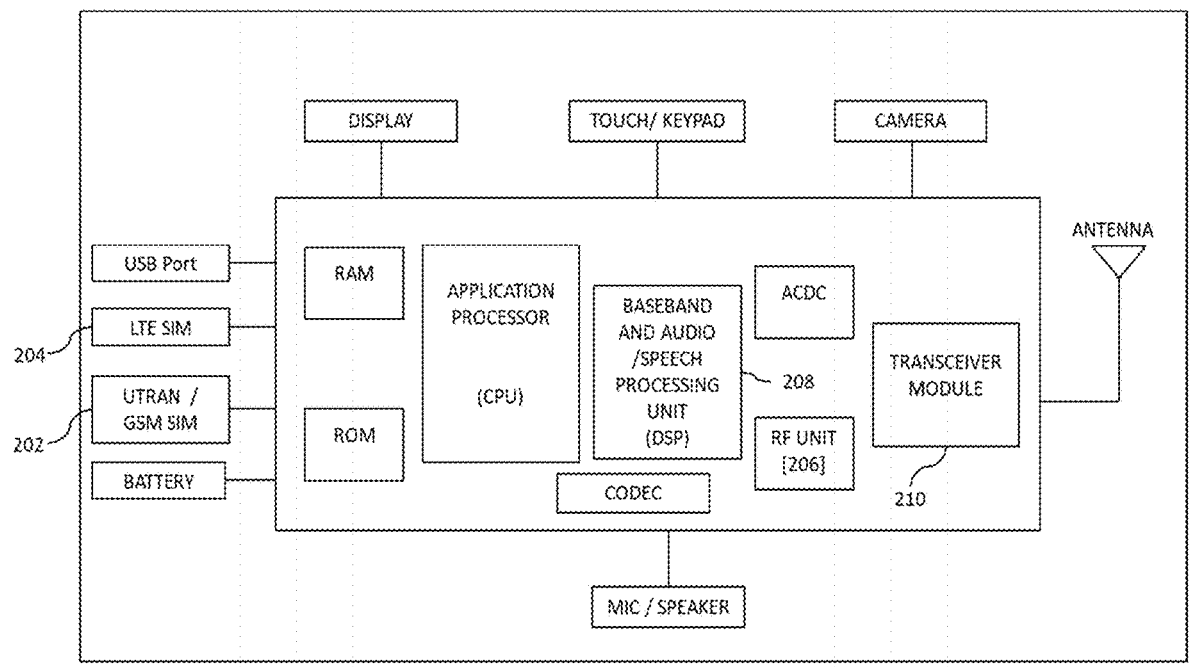
FIG. 2 illustrates an exemplary block diagram of a DSDS UE, in accordance with exemplary embodiments of the present invention.

Referring to FIG. 2 an exemplary block diagram of a Dual SIM dual standby (DSDS) UE, in accordance with exemplary embodiments of the present invention is shown.

As, indicated in the FIG. 2, the DSDS UE comprises a number of components such as including but not limited to a display, a touch/keypad, a camera, an universal serial bus (USB) port, a battery, a random access memory (RAM), a read-only memory (ROM), an application processor such as central processing unit (CPU), a coder-decoder (CODEC), a baseband and audio/speech processing unit such as a digital signal processor (DSP), a radio frequency (RF) unit, an ACDC unit, a MIC/speaker unit, an antenna unit, a transceiver module, a first SIM, for instance, an LTE SIM, a second SIM, for instance, a UTRAN/GSM SIM and any other such unit obvious to a person skilled in the art.

Also, the DSDS UE may comprise multiple units as disclosed in FIG. 2, except some specific units such as the DSDS UE may have only one radiofrequency (RF) unit and only one baseband (BB) unit, that can be shared by the different Subscriber Identities Modules (SIMs) of the DSDS UE.

Further, the FIG. 2 indicates that the DSDS UE comprises two different SIMs i.e. a first SIM such as an LTE SIM (204)

and a second SIM such as a UTRAN/GSM SIM (202). The DSDS UE is registered with a LTE network via the LTE SIM (204) and the DSDS UE is registered with a legacy network via the UTRAN/GSM SIM (202). Therefore, the DSDS UE is associated with two different radio access technologies (RATs) concurrently. Also, each of the first SIM and the second SIM as referred in the present invention may be one of a primary SIM and a secondary SIM, such as if first SIM is the primary SIM then the second SIM will be the secondary SIM and vice-versa.

Further, the FIG. 2 indicates that the DSDS UE comprises only a single baseband unit [208] and only a single radiofrequency (RF) unit [206]. The baseband unit [208] and the radiofrequency (RF) unit [206] of the DSDS UE can be shared by the two different subscriber identities modules i.e. by the LTE SIM (204) and the UTRAN/GSM SIM (202), in an idle discontinuous reception (Idle-DRX) mode.

Also, the DSDS UE comprises a transceiver unit [210], configured to communicate with the LTE network of the LTE SIM (204) and the legacy network of the UTRAN/GSM SIM (202), to avail one or more services from at least one of the LTE network and the legacy network.

Figure 3:
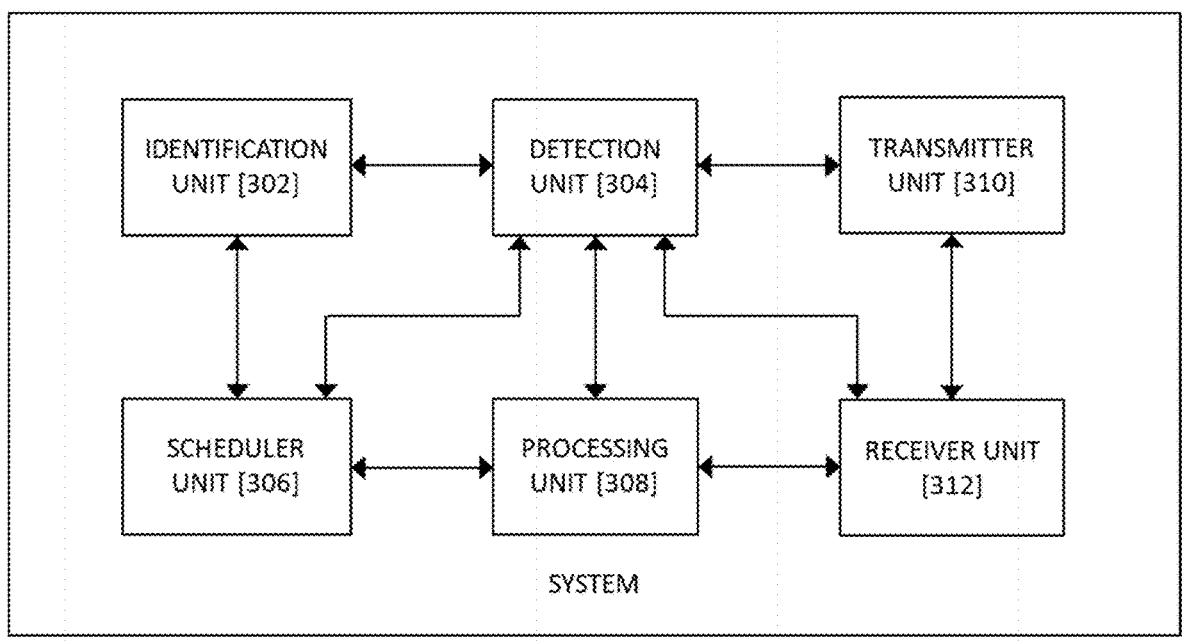
FIG. 3 illustrates an exemplary block diagram of the system for managing resource allocation in a multi-SIM user device comprising at least a first subscriber identity module (SIM) and a second subscriber identity module (SIM), in accordance with exemplary embodiments of the present invention.

Referring to FIG. 3 an exemplary block diagram of the system for managing resource allocation in a multi-SIM user device comprising at least a first subscriber identity module (SIM) and a second subscriber identity module (SIM), in accordance with exemplary embodiments of the present invention is shown.

The system comprises, at least one identification unit [302], at least one detection module [304], at least one scheduler unit [306], at least one processing unit [308], at least one transmitter unit [310] and at least one receiver unit [312]. All of these components/units are assumed to be connected to each other unless otherwise indicated below. Also, in FIG. 3 only few units are shown, however, the system may comprise multiple such units or the system may comprise any such numbers of the units, obvious to a person skilled in the art or as required to implement the features of the present disclosure.

The system is configured for managing resource allocation in a multi-SIM user device comprising at least a first subscriber identity module (SIM) and a second subscriber identity module (SIM), with the help of the interconnection between its components/units. Also, in an instance, the system is implemented at a network entity (for example at eNodeB) to manage physical downlink shared channel (PDSCH) resource allocation in a multi-SIM user device.

The at least one identification unit [302] of the system is configured to identify, in the physical downlink shared channel (PDSCH) at least one discontinuous transmission (DTX) event associated with the second SIM of the multi-SIM user device. In an instance, the second SIM may be the Primary SIM of the multi-SIM user device (i.e. the DSDS UE) and therefore, the first SIM may be the secondary SIM of the multi-SIM user device in said instance. Also, in one other instance, the first SIM may be the primary SIM of the multi-SIM user device and therefore the second SIM may be the secondary SIM of the multi-SIM user device in such instance.

Further, the at least one discontinuous transmission (DTX) event may comprise an indication of the detection of ACK/NACK erasures at a network entity, to identify at least one tune away gap in the multi-SIM user devices/DSDS UEs. The tune away gap may include a time duration for which the multi-SIM user device switches from one RAT to another RAT. For example, if in an event the at least one discontinuous transmission (DTX) event is detected at an eNodeB corresponding to an ongoing DL data session on default internet. The multi-SIM user device in said instance tunes away from the Primary LTE SIM and it will not attempt to receive downlink (DL) Data allocations (PDSCH) on LTE PDCCH channel. Thus, the eNodeB having allocated DL resources on PDSCH shall wait for corresponding HARQ ACK/NACKs in designed uplink Transmission Time Interval (TTIs). Failing to receive one, the eNodeB shall consider this ACK/NACK erasure as a DTX instance.

The at least one detection unit [304] is connected to the at least one identification unit [302]. The detection unit [304] configured to detect, at least tune away gap based on the identified at least one discontinuous transmission (DTX) event associated with the second SIM and a comparison of at least one uplink signal-to-interference-plus-noise ratio (SINR) value of the second SIM with a pre-determined decision-making threshold value. Further, the tune away gap comprises a time duration for which the multi-SIM user device switches from a second Radio Access Technology (RAT) network of the second SIM to a first RAT network of the first SIM.

Furthermore, once the at least one discontinuous transmission (DTX) event associated with the second SIM is identified, the detector unit [304] is then configured to compare at least one uplink SINR value of the second SIM with a pre-determined decision-making threshold value (Th_Valid_DTX), in order to filter-out poor RF scenario from DSDS scenarios and to detect the at least one tune away gap. For example, the detector unit [304] may be configured to use RF channel information available at an associated network entity (for instance at the eNodeB), like channel quality indicator (CQI) feedback and PUCCH/PUSCH SINR acquired/computed in previous UL TTIs for the DSDS UE, to ascertain the cause of DTX instance. Also, the decision making threshold value (Th_Valid_DTX), may be based on field-tests performed to obtain minimum RF quality beyond which the UE shall be considered as situated in poor RF conditions and thereby DTX instances corresponding to such UEs may be mapped to poor RF. Therefore, verifying DTX event occurrence with already available RF information with the network entity, serves as a reliable method of differentiating DTX events caused due to DSDS tune away events from genuine DTX events resulting due to poor RF conditions.

Thereafter, the detection unit [304] is further configured to detect, at least tune away gap, based on an event the at least one uplink SINR value of the second SIM is greater than the pre-determined decision-making threshold value, and at least one of a periodic detection of the at least tune away gap, and an aperiodic detection of the at least tune away gap.

Further, the at least one periodic detection further comprises determining at least one of at least one tune-away gap periodicity and at least one tune away gap duration associated with the second SIM, based on at least one of at least one tune away pattern of the second SIM, at least one paging cycle of the first SIM, and at least one Home Public Land Mobile Network (HPLMN) Selection via the first SIM. Furthermore, the detection unit [304] detects the periodic DSDS tune away instances for a particular UE and stores two associated parameters i.e. the tune-away gap periodicity and the tune-away gap duration. As discussed above, the Tune Away instances/gaps on DSDS UEs can be identified using DTX events (ACK/NACK erasures) detected at the network entity. Further, as the tune-away instances/gap caused by the DSDS UEs need to listen to paging on first SIM and to the DSDS UE's requirement to periodically search for HPLMN of first SIM's network operator fall under the category of periodic tune-away instances, thus the periodicity of the tune-away gaps caused due to DSDS UE's need to listen to paging on first SIM's network shall be one of the paging cycles. The detection unit [304] can monitor DTXs occurrences following this cycle to derive tune-away gap periodicity of a DSDS UEs. The detection unit [304] is also configured to measure tune-away duration for the same DSDS UE on periodic tune-away gaps caused due to listening of paging in order to derive tune-away duration for the same DSDS UE. Further, the detection unit [304] stores these both the tune-away periodicity and the tune-away duration for a DSDS UE as Tune-Away—Idle Mode Paging Parameter Set at the network entity associated with the second SIM.

Further, detection unit [304] is also configured to obtain both tune-away periodicity and tune-away duration for the DSDS UE (multi-SIM user device) periodically based on search for HPLMN of first SIM's network and store it at the network entity associated with the second SIM as Tune-Away—HPLMN Selection Parameter Set.

Furthermore, in an instance the periodic Tune-Away detection is required to be done in an extremely controlled manner, considering cost as a factor. For each multi-SIM user device (DSDS UE), detection unit [304] may be configured to acquire periodic Tune Away parameter set only once. Thus, when a DSDS UE latches for the first time, the detection unit [304] may be configured to start periodic Tune-Away detection and also to stops it when the DSDS UE transits to RRC IDLE state. For the DSDS UEs performing reselection on a new network, the detection unit [302] may be configured to start periodic Tune-Away detection when the DSDS UE comes to RRC Connected State for the first time and also to stop the process when it moves into RRC IDLE state. Also, in the instances of DSDS UEs doing handover from source network which had periodic Tune Away parameters stored, the detection unit [304] is configured to send all periodic Tune-Away parameters to target network via S1/X2 interface. Hence target network does not require to attempt detecting periodic tune away instances again and use the received parameters.

Further, the at least one scheduler unit [306] is connected to the at least one detection unit [304] and the at least one identification unit [302]. The scheduler unit [306], configured to adjust, at least one PDSCH resource allocation of the second SIM, wherein to adjust, the at least one PDSCH resource allocation the scheduler unit [306] is further configured to suspend or to restrict the at least one PDSCH resource allocation of the second SIM.

Thereafter, the system further comprises a transmitter unit [310] configured to transmit at least one request for a Channel Quality Indicator (CQI) report to the multi-SIM user device (DSDS UE), wherein the at least one request for the CQI report is transmitted based on suspending via the scheduler unit [306] the at least one PDSCH resource allocation of the second SIM. Further, in an instance, if the second SIM is an LTE SIM, the scheduler unit in such instance suspends the at least one PDSCH resource allocation of the second SIM until it Tune-in back on LTE, in order to serve both radio resource preservation at the eNodeB and at the same time to enhance HSI performance of the DSDS UE.

Also, the Channel Quality Indicator (CQI) is an indication of the downlink mobile radio channel quality as experienced by the DSDS UE. Essentially, the DSDS UE proposes to the network entity an optimum modulation scheme and coding rate to use for a given radio link quality, so that the resulting transport block error rate would not exceed 10%. The sixteen (16) available combinations of modulation scheme and coding rate are specified as possible CQI values. The DSDS UE may report different types of CQI. For instance, a "wideband CQI" refers to the complete system bandwidth. Alternatively, the DSDS UE may evaluate a "sub-band CQI" value per sub-band of a certain number of resource blocks which is configured by higher layers. The full set of sub-bands would cover the entire system bandwidth. In case of spatial multiplexing, a CQI per codeword needs to be reported.

Also, the at least one request for the CQI report transmitted to the multi-SIM user device (DSDS UE) is an aperiodic CQI request. Therefore, the scheduler unit [306] is further configured to provide Aperiodic CQI related configuration to the DSDS UE in RRC Connection Reconfiguration during initial setup. Furthermore, in an instance upon detection of DSDS Tune Away Instance, the scheduler unit [306], suspends all ongoing data scheduling for default internet traffic for the DSDS UE and send Aperiodic CQI request (DCI 0 with CQI Request indicator bit set to '1') in downlink.

Further, the scheduler unit [306] is further configured to schedule a single physical resource block (PRB) to each of the at least one PDSCH resource allocation in downlink data transmission to the second SIM, wherein the single physical resource block (PRB) is scheduled based on the restricting via the scheduler unit [306] the at least one PDSCH resource allocation of the second SIM. Further, the allocation of single PRBs to DSDS UEs in DSDS Tune Away duration is critical to the following step i.e., Resumption of Radio Resources. The scheduler unit [306] is further configured to listen to HARQACK/NACK in the designed UL TTI, failing to receive one, it is further configured to reallocate single PRB to that DSDS UE.

Further, the at least one processing unit [308] is connected to the at least one scheduler unit [306], the at least one detection unit [304] and the at least one identification unit [302]. The processing unit [308], configured to detect, one of a first event and a second event in response to said adjustment of the at least one PDSCH resource allocation. Thereafter, the scheduler unit [306] is further configured to resume the at least one PDSCH resource allocation of the second SIM based on the detection of the one of the first event and the second event.

Thereafter, in the event of the at least first event, the system further comprises a receiver unit [312] configured to receive the CQI report (i.e. the Aperiodic CQI report) from the multi-SIM user device in response to the transmitted at least one request for the CQI report. Thereafter, the scheduler unit [306] receives via the receiver unit [312], the Aperiodic CQI report sent by the DSDS UE on PUSCH channel in designed TTI (differs with TDD/FDD duplexing). The scheduler unit [306] thereafter on the basis of receives aperiodic CQI report configured to determine the suitable opportunity for the resumption of normal scheduling of the physical downlink shared channel (PDSCH) resource allocation in a multi-SIM user device.

Also, in an instance, failing to receive one the Aperiodic CQI report, the network entity continues with resource suspension and retransmits via the scheduler unit [306] the Aperiodic CQI request. The scheduler unit [306] is configured to continue with the above process until it is able to detect Aperiodic CQI report confirming DSDS UE's availability.

In addition to the Aperiodic CQI response event, the scheduler unit [306] is also configured to immediately break-out from radio resource suspension loop and resume normal scheduling if it detects any transmission from UE in uplink (e.g., Scheduling Request, Random Access Request periodic CSI, etc.).

Thereafter, in the event of the at least second event, the scheduler unit [306] is further configured to detect at least one hybrid automatic repeat request acknowledgement/negative-acknowledgement (HARQ ACK/NACK) on an uplink data transmission channel corresponding to the single PRB scheduled in the downlink data transmission to the second SIM. The Hybrid ARQ (HARQ), is a combination of Forward Error Coding (FEC) and ARQ scheme. The main principle of FEC coding is to introduce redundancy in the transmitted signal. In this way, the parity bits are added to the information bits prior to transmission. These parity checks are computed from the information bits using a method given by the coding structure. Further, in HARQ, unsuccessful attempts are used in FEC decoding instead of being discarded. The received packets are discarded and the receiver requests retransmissions of corrupted packets. HARQ relies on cyclic redundancy check (CRC) code for error detection. Also, Hybrid ARQ (HARQ) provides fast re-transmission and lowers the error rate in the physical link.

Thereafter, on receipt of the HARQ ACK/NACK on an uplink data transmission channel corresponding to the single PRB scheduled in the downlink data transmission to the second SIM, the scheduler unit [306] is configured to resume the at least one PDSCH resource allocation of the second SIM.

Therefore, the scheduler unit [306] is configured to resume the at least one PDSCH resource allocation of the second SIM based on the detection of the one of the first event and the second event.

Further, the scheduler unit [306] is also configured to adjust the at least one PDSCH resource allocation of the second SIM based on at least one of the Tune-Away—Idle Mode Paging Parameter Set and the Tune-Away—HPLMN Selection Parameter Set. For instance, for each DSDS UE, the scheduler unit [306] is configured to create a blank sub-frame pattern using tune-away periodicity and tune-away durations for both the tune-away causes and to abstain from allocating radio resources for the DSDS UE during its periodic tune-away instances. Thus, scheduler unit [306] utilizes preserved radio resource to schedule rest of the DSDS UEs.

Furthermore, since Voice/Video calls get higher precedence in DSDS UEs as compared to data session, an ongoing call on one of the SIMs shall push the other SIM into Radio Link Failure (RLF) state. The DSDS UE, therefore, dedicates its trans-receiver module to the SIM handling call in order to prevent any deterioration (voice cracking/muting due to RTP packet loss) of user experience during the call caused by other SIM. Hence there are no tune-away instances during an active call. The scheduler unit [306] is therefore configured to avoid adjusting the at least one PDSCH resource allocation while there is an active voice/video call, for instance during an ongoing LTE call (VoLTE/ViLTE) the scheduler unit [306] will not adjust the at least one PDSCH resource allocation. Further, instances such as SRBs carrying critical RRC, NAS and IMS SIP signalling, should also be exempted from being throttled by the scheduler unit [306].

Figure 4:
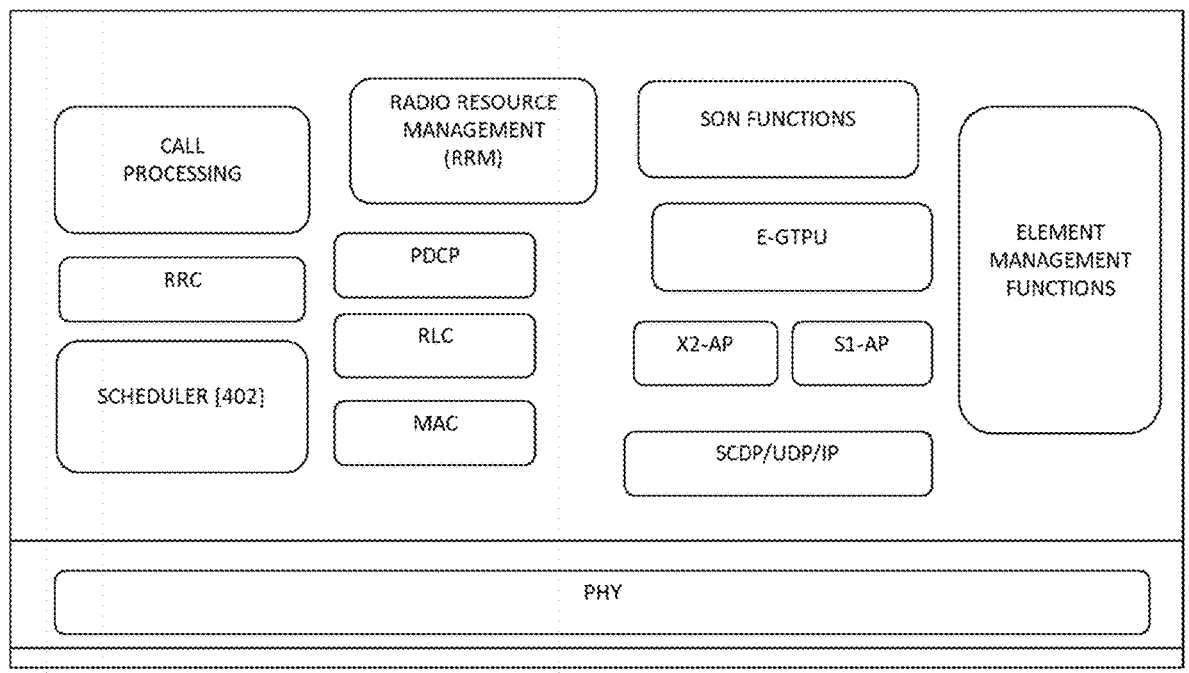
FIG. 4 illustrates an exemplary block diagram of LTE eNodeB, in accordance with exemplary embodiments of the present invention.

Referring to FIG. 4 illustrates an exemplary block diagram of LTE eNodeB, in accordance with exemplary embodiments of the present invention is shown.

As shown in FIG. 4 the LTE eNodeB may include but not limited to a call processing unit, a radio resource management unit, SON functions, E-GTPU, SCDP/UDP/IP protocols, X2-AP, S1-AP interfaces, MAC layer, RLC layer, PDCP layer, RRC layer, physical layer (phy), a scheduler and any other such unit obvious to a person skilled in the art.

Further, the LTE eNodeB is associated with one of the first SIM and the second SIM of the multi-SIM user device, in order to provide one or more LTE services via LTE SIM. Also, the scheduler [402] of the LTE eNodeB further comprises the above-defined system of the present invention, wherein the system is configured to manage physical downlink shared channel (PDSCH) resource allocation in a multi-SIM user device.

Further, the scheduler [402] identifies, via the identification unit [302], at least one discontinuous transmission (DTX) event associated with the second SIM of the multi-SIM user device. Thereafter, the scheduler [402] detects, via the detection unit [304], at least tune away gap based on the identified at least one discontinuous transmission (DTX) event and a comparison of at least one uplink signal-to-interference-plus-noise ratio (SINR) value of the second SIM with a pre-determined decision-making threshold value.

Further, the scheduler [402], adjusts, via the scheduler unit [306], at least one PDSCH resource allocation of the second SIM, wherein the adjusting, via a scheduler unit, at least one PDSCH resource allocation comprises one of a suspending the at least one PDSCH resource allocation of the second SIM and restricting the at least one PDSCH resource allocation of the second SIM. Thereafter, the scheduler [402], detects, via the processing unit [308], one of a first event and a second event in response to said adjustment of the at least one PDSCH resource allocation. The scheduler [402] further resumes via the scheduler unit [306], the at least one PDSCH resource allocation of the second SIM based on the detection of the one of the first event and the second event.

Figure 5:
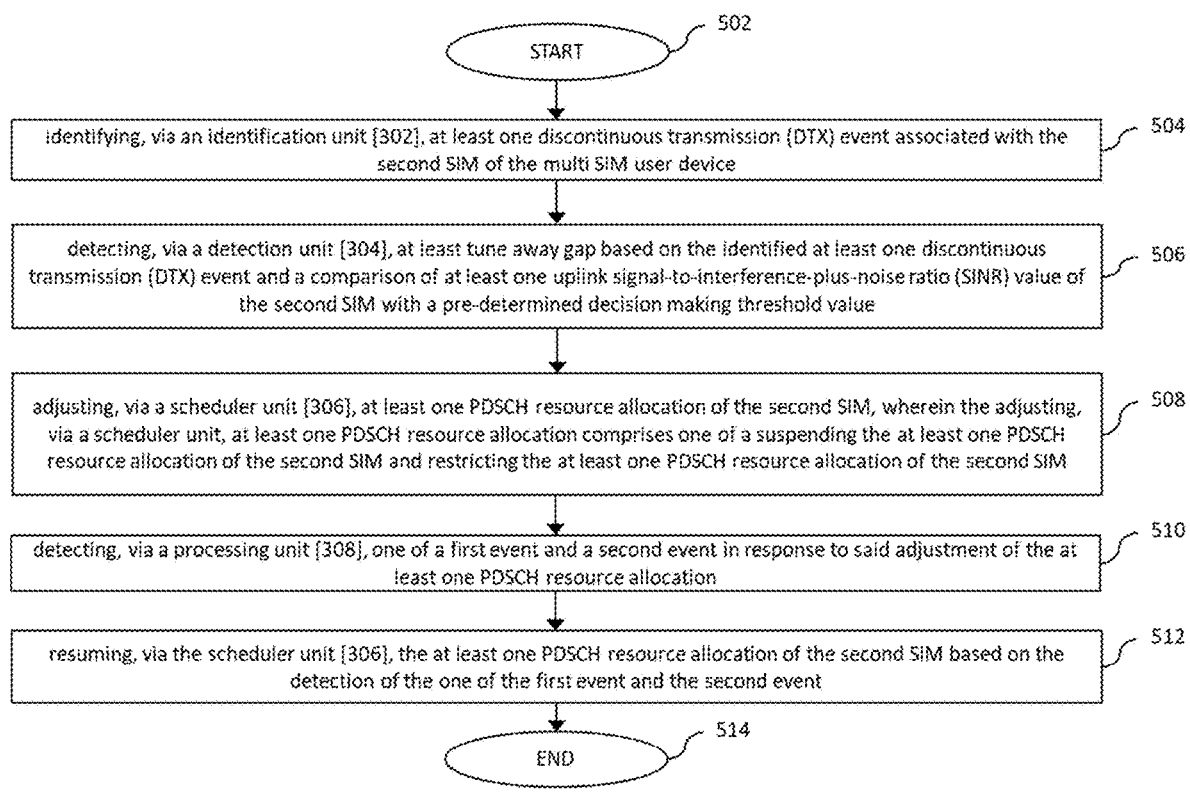
FIG. 5 illustrates an exemplary method flow diagram, depicting a method of managing resource allocation in a multi-SIM user device comprising at least a first subscriber identity module (SIM) and a second subscriber identity module (SIM), in accordance with exemplary embodiments of the present invention.

Referring to FIG. 5 illustrates an exemplary method flow diagram, depicting method of managing resource allocation in a multi-SIM user device comprising at least a first subscriber identity module (SIM) and a second subscriber identity module (SIM), in accordance with exemplary embodiments of the present invention is shown. As shown in FIG. 5, the method begins at step [502].

At step [504], the method comprises identifying, via an identification unit [302], in physical downlink shared channel (PDSCH), at least one discontinuous transmission (DTX) event associated with the second SIM of the multi-SIM user device. The at least one discontinuous transmission (DTX) event may comprise an indication of detection of ACK/NACK erasures at a network entity, to identify at least one tune away gap in the multi-SIM user devices/DSDS UEs. The tune away gap may include a time duration for which the multi-SIM user device switches from one RAT to another RAT. For example, if in an event the at least one discontinuous transmission (DTX) event is detected at an eNodeB corresponding to an ongoing DL data session on default internet. The multi-SIM user device in said instance tunes away from the Primary LTE SIM and it will not attempt to receive downlink (DL) Data allocations (PDSCH) on LTE PDCCH channel. Thus, the eNodeB having allocated DL resources on PDSCH shall wait for corresponding HARQ ACK/NACKs in designed uplink Transmission Time Interval (TTIs). Failing to receive one, the eNodeB shall consider this ACK/NACK erasure as a DTX instance.

Next, at step [506] the method comprises detecting, via a detection unit [304], at least tune away gap based on the identified at least one discontinuous transmission (DTX)

event and a comparison of at least one uplink signal-to-interference-plus-noise ratio (SINR) value of the second SIM with a pre-determined decision-making threshold value. Further, the tune away gap comprises a time duration for which the multi-SIM user device switches from a second Radio Access Technology (RAT) network of the second SIM to a first RAT network of the first SIM.

Further, once the at least one discontinuous transmission (DTX) event associated with the second SIM is identified, the method further encompasses comparing via the detection unit [304], at least one uplink SINR value of the second SIM with a pre-determined decision-making threshold value (Th_Valid_DTX), in order to filter-out poor RF scenario from DSDS scenarios and to detect the at least one tune away gap. Also, the decision making threshold value (Th_Valid_DTX), may be based on field-tests performed to obtain minimum RF quality beyond which the UE shall be considered as situated in poor RF conditions and thereby DTX instances corresponding to such UEs may be mapped to poor RF.

Further, the method comprises detecting, via a detection unit [306], at least tune away gap is further based on an event the at least one uplink SINR value of the second SIM is greater than the pre-determined decision-making threshold value, and at least one of a periodic detection of the at least tune away gap and an aperiodic detection of the at least tune away gap.

Thereafter, the at least one periodic detection further comprises determining at least one of at least one tune-away gap periodicity and at least one tune away gap duration associated with the second SIM, based on at least one of at least one tune away pattern of the second SIM, at least one paging cycle of the first SIM, and at least one Home Public Land Mobile Network (HPLMN) Selection via the first SIM. Furthermore, the method encompasses detecting via the detection unit [304], the periodic DSDS tune away instances for a particular DSDS UE and storing two associated parameters i.e. the tune-away gap periodicity and the tune-away gap duration. Further, as the tune-away instances/gap caused by the DSDS UEs need to listen to paging on first SIM and to the DSDS UE's requirement to periodically search for HPLMN of first SIM's network operator, fall under the category of periodic tune-away instances, thus the periodicity of the tune-away gaps caused due to DSDS UE's need to listen to paging on first SIM's network shall be one of the paging cycles. The method further comprises monitoring via the detection unit [304], DTXs occurrences following this paging cycle to derive tune-away gap periodicity of a DSDS UE. The method also encompasses measuring via the detection unit [304], tune-away duration for the same DSDS UE, on periodic tune-away gaps caused due to listening of paging in order to derive tune-away duration for the same DSDS UE. Further, the method encompasses storing via the detection unit [304], both the tune-away periodicity and the tune-away duration for a DSDS UE as Tune-Away—Idle Mode Paging Parameter Set at the network entity associated with the second SIM.

Further, the method also encompasses obtaining via the detection unit [304], both tune-away periodicity and tune-away duration for the DSDS UE (multi-SIM user device) periodically based on search for HPLMN of first SIM's network and store it at the network entity associated with the second SIM as Tune-Away—HPLMN Selection Parameter Set.

Next, at step [508] the method comprises adjusting, via a scheduler unit [306], at least one PDSCH resource allocation of the second SIM, wherein the adjusting, via a scheduler unit [306], at least one PDSCH resource allocation comprises one of a suspending the at least one PDSCH resource allocation of the second SIM and restricting the at least one PDSCH resource allocation of the second SIM.

Thereafter, the suspending the at least one PDSCH resource allocation of the second SIM further comprises transmitting via a transmitter unit [310], at least one request for a Channel Quality Indicator (CQI) report to the multi-SIM user device. Further, the at least one transmitted request for the CQI report is an aperiodic CQI request. Also, the Channel Quality Indicator (CQI) is an indication of the downlink mobile radio channel quality as experienced by the DSDS UE. Further, in an instance, if the second SIM is an LTE SIM, the method in such instance suspends the at least one PDSCH resource allocation of the second SIM until it Tune-in back on LTE, in order to serve both radio resource preservation at the eNodeB and at the same time to enhance HSI performance of the DSDS UE.

As, the at least one request for the CQI report transmitted to the multi-SIM user device (DSDS UE) is an aperiodic CQI request, the method via the scheduler unit [306] further provides Aperiodic CQI related configuration to the DSDS UE in RRC Connection Reconfiguration during initial setup. Furthermore, in an instance upon detection of DSDS Tune Away Instance/gap, the method encompasses suspending via scheduler unit [306] all ongoing data scheduling for default internet traffic for the DSDS UE and send Aperiodic CQI request (DCI 0 with CQI Request indicator bit set to '1') in downlink.

Next, the restricting the at least one PDSCH resource allocation of the second SIM further comprises scheduling via the scheduler unit [306], a single physical resource block (PRB) to each of the at least one PDSCH resource allocation in downlink data transmission to the second SIM. Further, the allocation of single PRBs to DSDS UEs in DSDS Tune Away duration is critical to the following step i.e., Resumption of Radio Resources. The method thereafter encompasses listening via the scheduler unit [306], HARQ ACK/NACK in the designed UL TTI, failing to receive one, it is further configured to reallocate single PRB to that DSDS UE.

Next, at step [510] the method comprises detecting, via a processing unit [308], one of a first event and a second event in response to said adjustment of the at least one PDSCH resource allocation. The at least first event comprises receiving at a receiver unit [312], the CQI report (i.e. the Aperiodic CQI report) from the multi-SIM user device in response of the transmitted at least one request for a CQI report. Thereafter, the method encompasses receiving at the scheduler unit [306] via the receiver unit [312], the Aperiodic CQI report sent by the DSDS UE on PUSCH channel in designed TTI (differs with TDD/FDD duplexing). The scheduler unit [306] thereafter on the basis of receives aperiodic CQI report configured to determine the suitable opportunity for resumption of normal scheduling of the physical downlink shared channel (PDSCH) resource allocation in a multi-SIM user device.

Also, in an instance, failing to receive one the Aperiodic CQI report, the network entity continues with resource suspension and retransmits via the scheduler unit [306] the Aperiodic CQI request. The method in such instance continues with the above process until it is able to detect Aperiodic CQI report confirming DSDS UE's availability.

In addition to the Aperiodic CQI response event, the method also immediately break-out from radio resource suspension loop and resume normal scheduling if it detects any transmission from UE in uplink (e.g., Scheduling Request, Random Access Request periodic CSI, etc.).

Further, the at least second event comprises detecting at least one hybrid automatic repeat request acknowledgement/negative-acknowledgement (HARQ ACK/NACK) on an uplink data transmission channel corresponding to the single PRB scheduled in the downlink data transmission to the second SIM. The Hybrid ARQ (HARQ), is a combination of Forward Error Coding (FEC) and ARQ scheme. The main principle of FEC coding is to introduce redundancy in the transmitted signal. In this way, the parity bits are added to the information bits prior to transmission. These parity checks are computed from the information bits using a method given by the coding structure. Further, in HARQ, unsuccessful attempts are used in FEC decoding instead of being discarded. The received packets are discarded and the receiver requests retransmissions of corrupted packets. HARQ relies on cyclic redundancy check (CRC) code for error detection. Also, Hybrid ARQ (HARQ) provides fast re-transmission and lowers the error rate in the physical link.

Further, at step [512] the method comprises resuming, via the scheduler unit [306], the at least one PDSCH resource allocation of the second SIM based on the detection of the one of the first event and the second event. More specifically, the method encompasses resuming, via the scheduler unit [306], the at least one PDSCH resource allocation of the second SIM based on the receipt of the aperiodic CQI report from the multi-SIM user device. Also, the method encompasses resuming, via the scheduler unit [306], the at least one PDSCH resource allocation of the second SIM based on the receipt of the HARQ ACK/NACK on an uplink data transmission channel corresponding to the single PRB scheduled in the downlink data transmission to the second SIM.

Thereafter, the method also comprises adjusting, via the scheduler unit [306], the at least one PDSCH resource allocation of the second SIM based on at least one of a Tune-Away—Idle Mode Paging Parameter Set and a Tune-Away—HPLMN Selection Parameter Set. For instance, for each DSDS UE, the method encompasses creating a blank sub-frame pattern using tune-away periodicity and tune-away durations for both the tune-away causes and abstaining from allocating radio resources for the DSDS UE during its periodic tune-away instances.

Furthermore, since Voice/Video calls get higher precedence in DSDS UEs as compared to data session, an ongoing call on one of the SIMs shall push the other SIM into Radio Link Failure (RLF) state. The DSDS UE, therefore, dedicates its trans-receiver module to the SIM handling call in order to prevent any deterioration (voice cracking/muting due to RTP packet loss) of user experience during the call caused by other SIM. Hence there are no tune-away instances during an active call. The method, therefore, encompasses avoiding the adjustment of the at least one PDSCH resource allocation while there is an active voice/video call, such as an ongoing LTE call (VoLTE/ViLTE). Further, the method also encompasses exempting instances such as SRBs carrying critical RRC, NAS and IMS SIP signalling, from being throttled.

After managing physical downlink shared channel (PDSCH) resource allocation in a multi-SIM user device comprising at least a first subscriber identity module (SIM) and a second subscriber identity module (SIM), the method further terminates at step [514].

Further, one aspect of the of the present invention relates to a base station for managing resource allocation in a multi-SIM user device comprising at least a first subscriber identity module (SIM) and a second subscriber identity module (SIM). The base station comprising an identification unit [302], configured to identify, in the physical downlink shared channel (PDSCH), at least one discontinuous transmission (DTX) event associated with the second SIM of the multi-SIM user device. Further, the base station comprises a detection unit [304], configured to detect, at least tune away gap based on the identified at least one discontinuous transmission (DTX) event and a comparison of at least one uplink signal-to-interference-plus-noise ratio (SINR) value of the second SIM with a pre-determined decision-making threshold value. The base station further comprises a scheduler unit [306], configured to adjust, at least one PDSCH resource allocation of the second SIM, wherein to adjust, the at least one PDSCH resource allocation the scheduler unit [306] is further configured to suspend or restrict the at least one PDSCH resource allocation of the second SIM. Thereafter, the base station comprises a processing unit [308], configured to detect, one of a first event and a second event in response to said adjustment of the at least one PDSCH resource allocation. Further, the scheduler unit [306] is further configured to resume the at least one PDSCH resource allocation of the second SIM based on the detection of the one of the first event and the second event.

Figure 6:
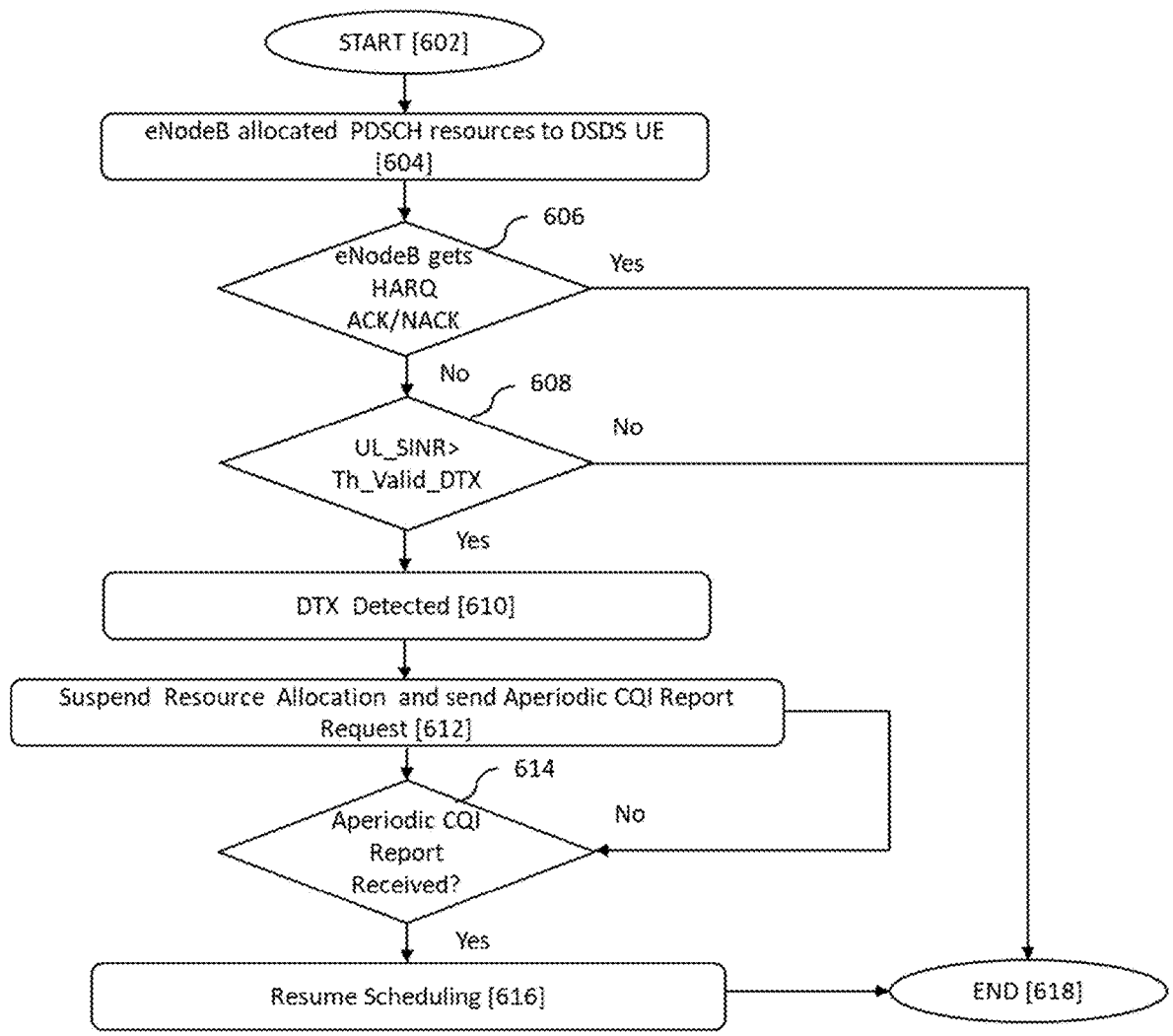
FIG. 6 illustrates an exemplary flow diagram, depicting an instance implementation of the process of managing resource allocation in a multi-SIM user device, based on an aperiodic CQI, in accordance with exemplary embodiments of the present invention.

Referring to FIG. 6, an exemplary flow diagram, depicting an instance implementation of the process of managing resource allocation in a multi-SIM user device, based on an aperiodic CQI, in accordance with exemplary embodiments of the present invention is shown.

As shown in FIG. 6, the process starts at step [602]. The eNodeB encompasses the system of the present invention, configured to manage physical downlink shared channel (PDSCH) resource allocation in a multi-SIM user device and the eNodeB is associated with one of a first SIM and a second SIM of the DSDS UE, wherein the SIM associated with the eNodeB is an LTE SIM.

At step [604] the method encompasses an allocation of one or more PDSCH resources to DSDS UE via an eNodeB.

Next, at step [606] the method comprises determining reception of at least one HARQ ACK/NACK at the eNodeB in response to the allocated one or more PDSCH resources. In an instance the at least one HARQ ACK/NACK received at the eNodeB, the process further leads to the step [618], otherwise, the process leads to step [608].

Next, at step [608] the method comprises determining whether at least one uplink signal-to-interference-plus-noise ratio value (UL_SINR) associated with the LTE SIM is greater than a pre-determined decision making threshold value (Th_Valid_DTX). In an event the at least one uplink SINR value is greater than the pre-determined decision-making threshold value the method leads to step [610] otherwise the method leads to step [618].

Next, at step [610] the method comprises detection of a discontinuous transmission (DTX) event caused due to at least tune one away gap.

Next, at step [612] the method comprises suspending resource allocation from the eNodeB to the DSDS UE and sending aperiodic CQI report request to the DSDS UE.

Next, at step [614] the method comprises determining whether aperiodic CQI report received from the DSDS UE in response of the transmitted aperiodic CQI report request. In an instance if the aperiodic CQI report not received from the DSDS UE the method leads to step [612], otherwise, the method leads to step [616].

Next, at step [616] the method comprises resuming the at least one PDSCH resource allocation via the eNodeB to the DSDS UE.

After, managing physical downlink shared channel (PDSCH) resource allocation in a multi-SIM user device, based on an aperiodic CQI, the method terminates at step [618].

Figure 7:
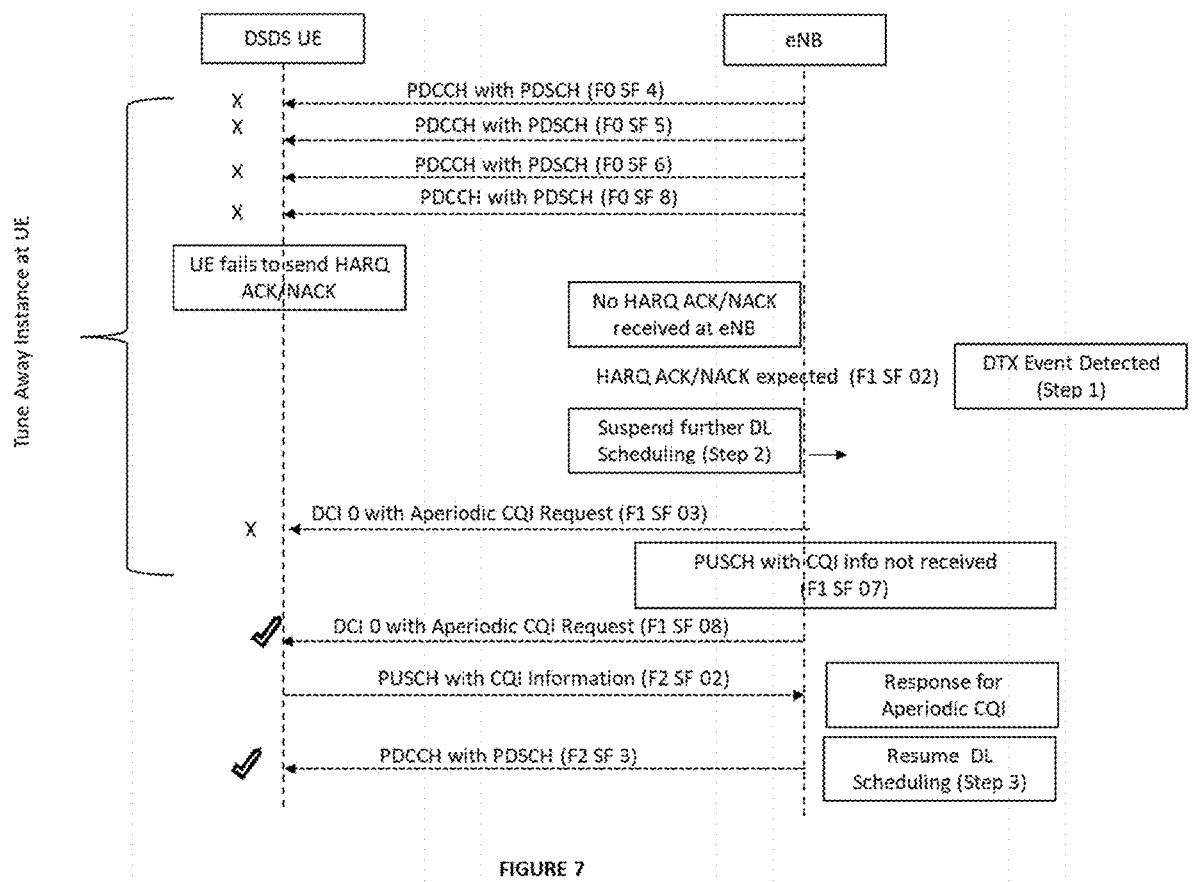
FIG. 7 illustrates an exemplary sequence diagram, depicting an instance implementation of core working principle of the aperiodic CQI based process with sample exchange of lower layer signaling between UE and LTE eNodeB operating in TDD (2, 7) configuration, in accordance with exemplary embodiments of the present invention.

Referring to FIG. 7, an exemplary sequence diagram, depicting an instance implementation of core working principle of the aperiodic CQI based process with sample exchange of lower layer signalling between UE and LTE eNodeB operating in TDD (2, 7) configuration, in accordance with exemplary embodiments of the present invention is shown.

FIG. 7 indicates an eNodeB is associated with one of the SIM of the DSDS UE, wherein the associated SIM is an LTE SIM. The eNodeB further allocates one or more resources to the DSDS UE. The eNodeB transmits to the DSDS UE, PDCCH with PDSCH (F0 SF 4), PDCCH with PDSCH (F0 SF 5), PDCCH with PDSCH (F0 SF 6) and PDCCH with PDSCH (F0 SF 8). Thereafter, due to tune away instance at the DSDS UE, the DSDS UE fails to send HARQ ACK/NACK to the eNodeB.

Therefore, no HARQ ACK/NACK received at eNodeB (eNB). Further, as at eNodeB a HARQ ACK/NACK was expected (F1 SF 02), and as no HARQ ACK/NACK received at eNodeB, a DTX event will be detected the Step 1.

Further, at Step 2, the eNB suspend further downlink (DL) Scheduling to the DSDS UE and the eNB also then transmits to the DSDS UE a DCI 0 with Aperiodic CQI Request (F1 SF 03).

Further, if PUSCH with CQI info not received (F1 SF 07), the eNB transmits to the DSDS UE a DCI 0 with Aperiodic CQI Request (F1 SF 08).

Further, if PUSCH with CQI Information (F2 SF 02) as a response for aperiodic CQI is received at the eNB from the DSDS UE, the eNB transmits PDCCH with PDSCH (F2 SF 3) to the DSDS UE.

Thereafter, the eNB at Step 3, resumes DL scheduling to the DSDS UE.

Figure 8:
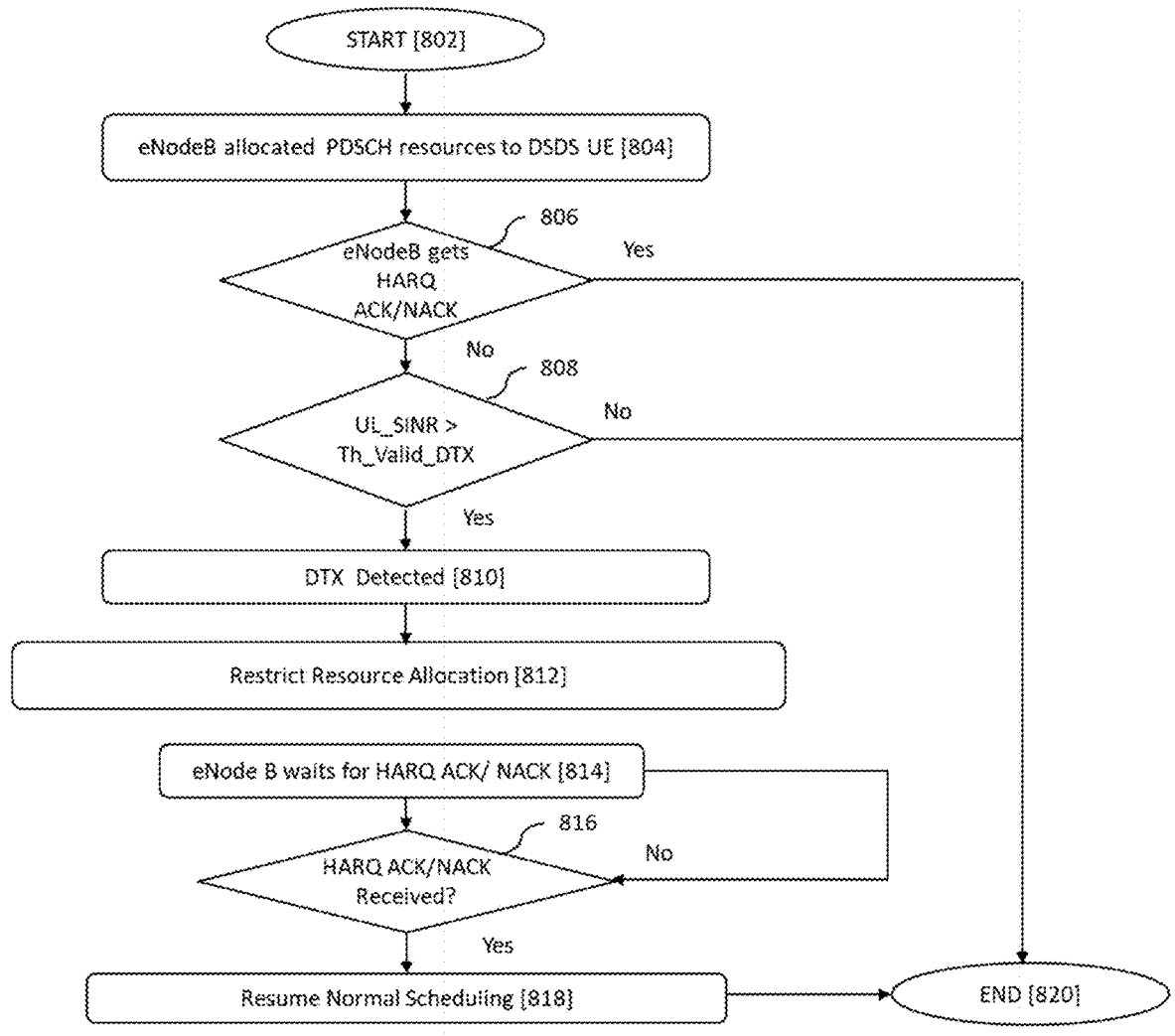
FIG. 8 illustrates an exemplary flow diagram, depicting an instance implementation of the process of managing resource allocation in a multi-SIM user device, based on a Hybrid Automatic Repeat Request (HARQ), in accordance with exemplary embodiments of the present invention.

Referring to FIG. 8, an exemplary flow diagram, depicting an instance implementation of the process of managing resource allocation in a multi-SIM user device, based on a Hybrid Automatic Repeat Request (HARQ), in accordance with exemplary embodiments of the present invention is shown.

As shown in FIG. 8, the process starts at step [802]. The eNodeB encompasses the system of the present invention, configured to manage physical downlink shared channel (PDSCH) resource allocation in a multi-SIM user device and the eNodeB is associated with one of a first SIM and a second SIM of the DSDS UE, wherein the SIM associated with the eNodeB is an LTE SIM.

At step [804] the method encompasses an allocation of one or more PDSCH resources to DSDS UE via an eNodeB.

Next, at step [806] the method comprises determining reception of at least one HARQ ACK/NACK at the eNodeB in response to the allocated one or more PDSCH resources. In an instance the at least one HARQ ACK/NACK received at the eNodeB, the process further leads to the step [820], otherwise, the process leads to step [808].

Next, at step [808] the method comprises determining whether at least one uplink signal-to-interference-plus-noise ratio value (UL_SINR) associated with the LTE SIM is greater than a pre-determined decision making threshold value (Th_Valid_DTX). In an event the at least one uplink SINR value is greater than the pre-determined decision-making threshold value the method leads to step [810] otherwise the method leads to step [820].

Next, at step [810] the method comprises detection of a discontinuous transmission (DTX) event caused due to at least tune one away gap.

Next, at step [812] the method comprises restricting resource allocation from the eNodeB to the DSDS UE, wherein the restricting the at least one resource allocation further comprises scheduling, a single physical resource block (PRB) to each of the PDSCH resource allocation in downlink data transmission.

Next, at step [814] the method indicates that the eNodeB after scheduling, a single physical resource block (PRB) to the PDSCH resource allocation in downlink data transmission, waits for HARQ ACK/NACK from the DSDS UE.

Next, at step [816] the method comprises determining whether HARQ ACK/NACK is received from the DSDS UE in response of the single physical resource block (PRB). In an instance if the HARQ ACK/NACK is not received from the DSDS UE the method leads to step [814], otherwise, the method leads to step [818].

Next, at step [818] the method comprises resuming the at least one PDSCH resource allocation via the eNodeB to the DSDS UE.

After, managing physical downlink shared channel (PDSCH) resource allocation in a multi-SIM user device, based on Hybrid Automatic Repeat Request (HARQ), the method terminates at step [820].

Figure 9:
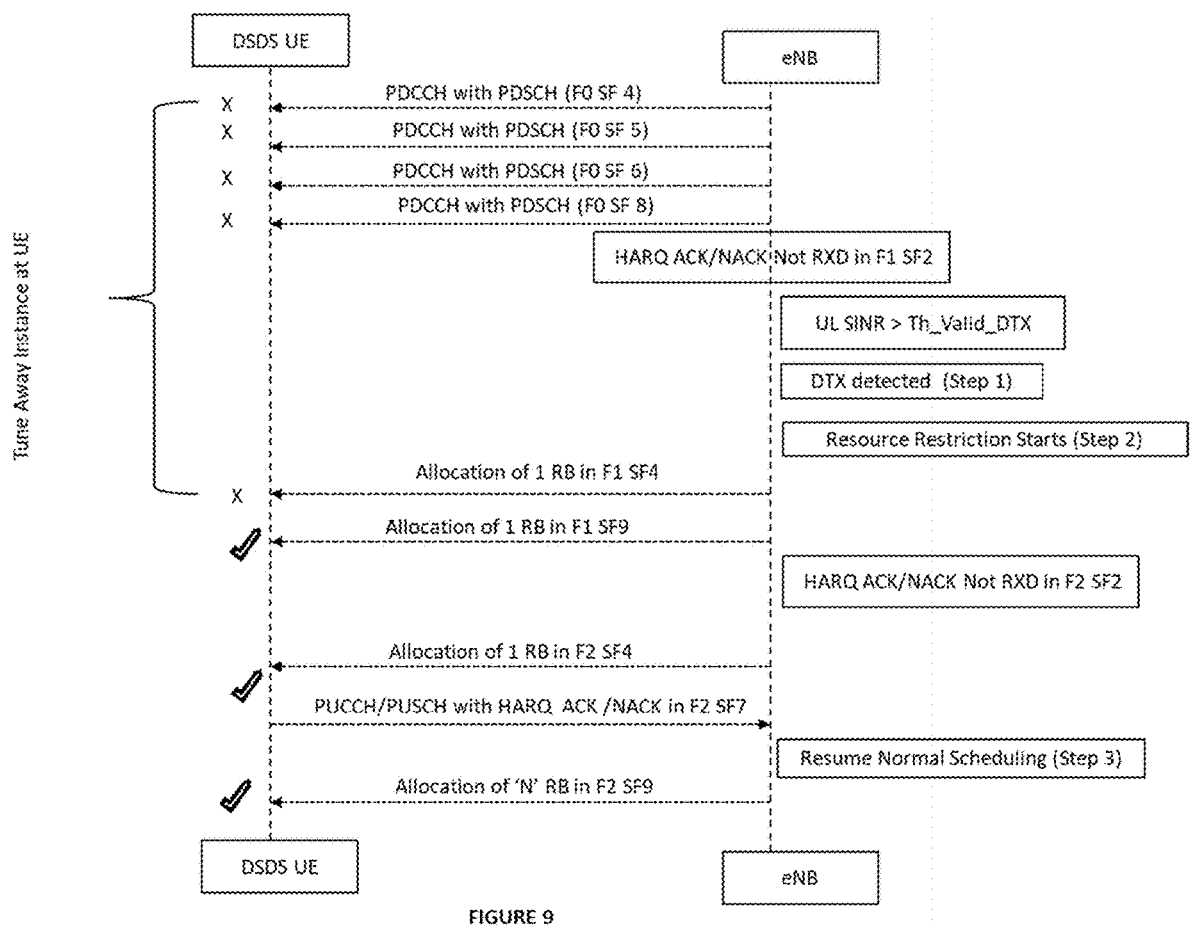
FIG. 9 illustrates an exemplary sequence diagram, depicting an instance implementation of core working principle of the HARQ based process with sample exchange of lower layer signaling between UE and LTE eNodeB operating in TDD (2, 7) configuration, in accordance with exemplary embodiments of the present invention.

Referring to FIG. 9, an exemplary sequence diagram, depicting an instance implementation of core working principle of the HARQ based process with sample exchange of lower layer signalling between UE and LTE eNodeB operating in TDD (2, 7) configuration, in accordance with exemplary embodiments of the present invention is shown.

FIG. 9 indicates an eNodeB is associated with one of the SIM of the DSDS UE, wherein the associated SIM is an LTE SIM. The eNodeB further allocates one or more resources to the DSDS UE. The eNodeB transmits to the DSDS UE, PDCCH with PDSCH (F0 SF 4), PDCCH with PDSCH (F0 SF 5), PDCCH with PDSCH (F0 SF 6) and PDCCH with PDSCH (F0 SF 8). Thereafter, due to tune away instance at the DSDS UE, the DSDS UE fails to send HARQ ACK/NACK to the eNodeB.

Further, no HARQ ACK/NACK received at eNodeB (eNB), therefore HARQ ACK/NACK Not received in F1 SF2, detected at the eNB. Thereafter, the eNB checks if the at least one uplink signal-to-interference-plus-noise ratio value (UL_SINR) is greater than a pre-determined decision-making threshold value (Th_Valid_DTX), to identify a tune away instance/gap. Further, the tune away instance is detected if the UL_SINR is greater than the pre-determined decision-making threshold value (Th_Valid_DTX) and in such instance, the eNodeB, detects a DTX event at Step 1.

Further, at Step 2, the eNB restricts resource allocation from the eNB to the DSDS UE, wherein the restricting the at least one resource allocation further comprises scheduling, a single physical resource block (PRB) for the resource allocation in downlink data transmission. The eNB thereafter allocates to the DSDS UE RB in F1 SF4, further the DSDS US fails to send the HARQ ACK/NACK to the eNB due to tune away instance at the DSDS UE.

Thereafter, the eNB allocates to the DSDS UE 1 RB in F1 SF9 and the eNB thereafter waits for the HARQ ACK/NACK from the DSDS UE. Further, if no HARQ ACK/NACK is received from the DSDS UE, the eNB allocates to the DSDS UE 1 RB in F2 SF4.

Further, the eNB receives from the DSDS UE, PUCCH/PUSCH with HARQ ACK/NACK in F2 SF7 and based on the said receipt of the PUCCH/PUSCH with HARQ ACK/

NACK in F2 SF7, the eNB at Step 3 resumes the normal scheduling of resource allocation to the DSDS UE.

Further, upon resuming normal scheduling of resource allocation to the DSDS UE, the eNB allocates to the DSDS UE 'N' RB in F2 SF9.

Figure 10:
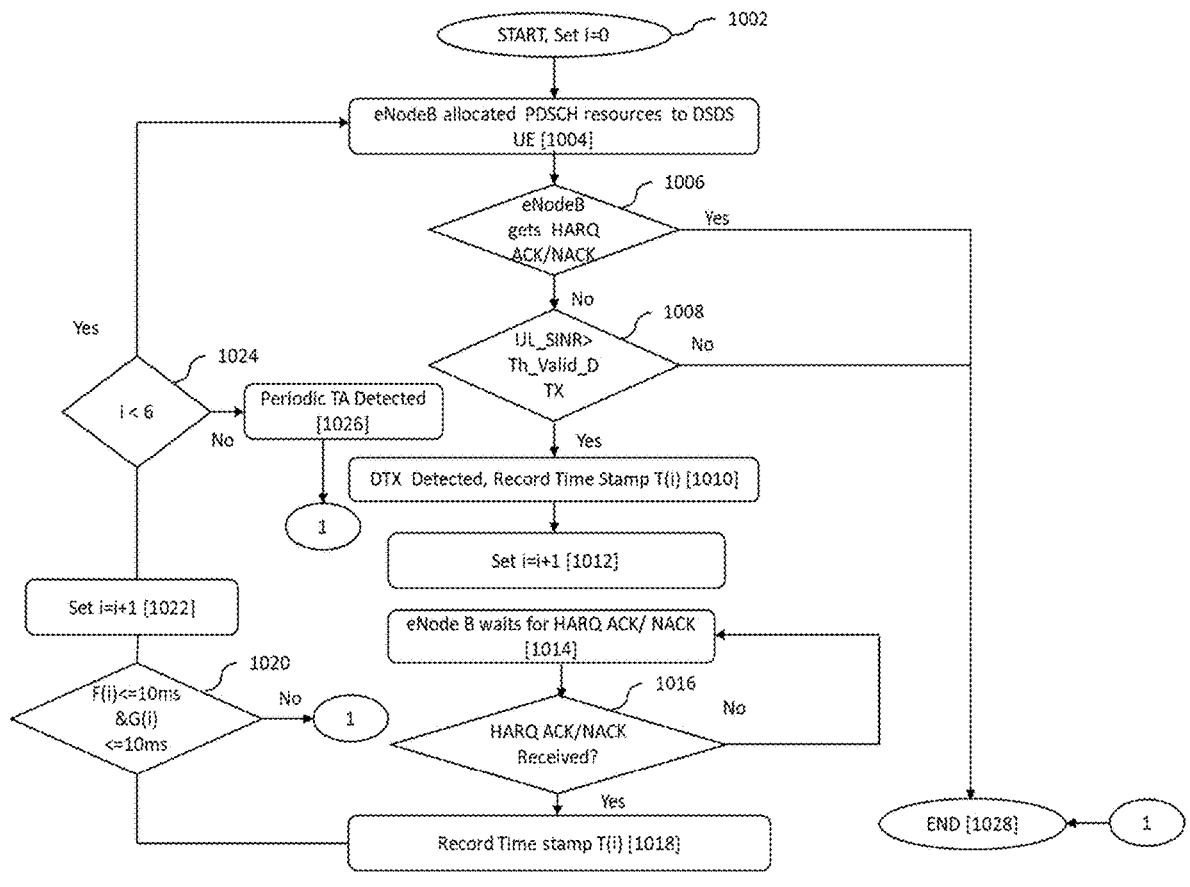
FIG. 10 illustrates an exemplary flow diagram, depicting an instance implementation of the process of detecting aperiodic tune away, in accordance with exemplary embodiments of the present invention.

Referring to FIG. 10, an exemplary flow diagram, depicting an instance implementation of the process of detecting periodic tune away, in accordance with exemplary embodiments of the present invention is shown.

As shown in FIG. 10, the process starts at step [1002]. Also, in order to determine periodic tune away, iterations are followed and therefore at step [1002], the value of i is set to 0. Further, the eNodeB encompasses the system of the present invention, configured to manage physical downlink shared channel (PDSCH) resource allocation in a multi-SIM user device and the eNodeB is associated with one of a first SIM and a second SIM of the DSDS UE, wherein the SIM associated with the eNodeB is an LTE SIM.

At step [1004] the method encompasses an allocation of one or more PDSCH resources to DSDS UE via an eNodeB.

Next, at step [1006] the method comprises determining reception of at least one HARQ ACK/NACK at the eNodeB in response to the allocated one or more PDSCH resources. In an instance the at least one HARQ ACK/NACK received at the eNodeB, the process further leads to the step [1028], otherwise, the process leads to step [1008].

Next, at step [1008] the method comprises determining whether at least one uplink signal-to-interference-plus-noise ratio value (UL_SINR) associated with the LTE SIM is greater than a pre-determined decision making threshold value (Th_Valid_DTX). In an event the at least one uplink SINR value is greater than the pre-determined decision-making threshold value the method leads to step [1010] otherwise the method leads to step [1028].

Next, at step [1010] the method comprises detection of a discontinuous transmission (DTX) event caused due to at least tune one away gap and the method therefore at step [1010] record time stamp T (i).

Next, at step [1012] the method comprises setting the value of i equals to i+1, i.e. i=i+1.

Next, at step [1014] the method indicates that the eNodeB after setting the value of i equals to i+1, waits for HARQ ACK/NACK from the DSDS UE.

Next, at step [1016] the method comprises determining whether HARQ ACK/NACK is received from the DSDS UE at the eNodeB. In an instance if the HARQ ACK/NACK is not received from the DSDS UE the method leads to step [1014], otherwise, the method leads to step [1018].

Next, at step [1018] the method after receiving at the eNodeB, the HARQ ACK/NACK from the DSDS UE, record time stamp T (i).

Next, at step [1020] the method comprises determining whether tolerance values (F (i) and G (i)) are less than or equal to 10 ms, i.e. the method determines F (i)<=10 ms & G (i)<=10 ms. If F (i)<=10 ms & G (i)<=10 ms, the method leads to step [1022], otherwise the method leads to step [1028]. Also, the tolerance values (F (i) and G (i)) are explained as below:

$$F(i)=0 \text{ for } i=1, \& G(i)=0 \text{ for } i<5$$

$$F(i)=|[T(i)-T(i-1)]-[T(i-2)-T(i-3)]|, G(i)=|[T(i-1)-T(i-3)]-[T(i-3)-T(i-5)]|$$

Next, at step [1022] the method comprises setting the value of i equals to i+1, i.e. i=i+1.

Next, at step [1024] the method comprises determining whether i<6. If i<6, the method leads to step [1004], otherwise, the method leads to step [1026].

Next, at step [1026] the method indicates that a periodic tune away (TA) is detected.

Furthermore, as explained above, FIG. 10 indicates that the periodic tune-away instance is detected when three consecutive tune-away instances having the same Tune Away durations are detected in a periodic manner. Further, Maximum of [T(5)−T(4)], [T(3)−T(2)] and [T(1)−T(0)] are stored as Tune Away duration while Maximum of [T(4)−T(2)] and [T(2)−T(0)] are stored as the Tune Away periodicity with T(0) stored as that first instance of periodic Tune Away detected.

After successfully detecting the periodic tune away, the method further terminates at step [1028].

Thus, the present invention provides a novel solution for the technical problem of resource allocation in a multi-SIM user devices. Particularly, the solution of the present invention provides technical effect of minimization of performance degradation in multi-SIM user devices by minimizing HSI degradation, improving throughput for network subscriptions in multi-SIM, multi-RATs wireless devices and by preventing a substantial decline in average throughput experienced at the in multi-SIM user devices/DSDS UEs.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for managing resource allocation in a multi-SIM user device comprising at least a first subscriber identity module (SIM) and a second subscriber identity module (SIM), the method comprising:

identifying, via an identification unit [302] in physical downlink shared channel (PDSCH), at least one discontinuous transmission (DTX) event associated with the second SIM of the multi-SIM user device;

detecting, via a detection unit [304], at least one tune away gap based on the identified at least one discontinuous transmission (DTX) event and a comparison of at least one uplink signal-to-interference-plus-noise ratio (SINR) value of the second SIM with a pre-determined decision-making threshold value;

adjusting, via a scheduler unit [306], at least one PDSCH resource allocation of the second SIM, wherein:
the adjusting, via the scheduler unit, at least one PDSCH resource allocation comprises restricting the at least one PDSCH resource allocation of the second SIM, wherein the restricting the at least one PDSCH resource allocation of the second SIM comprises scheduling via the scheduler unit [306], a single physical resource block (PRB) to each of the at least one PDSCH resource allocation in downlink data transmission to the second SIM;

detecting, via a processing unit [308], one of a first event and a second event in response to said adjustment of the at least one PDSCH resource allocation; and resuming, via the scheduler unit [306], the at least one PDSCH resource allocation of the second SIM based on the detection of the one of the first event and the second event.

2. The method as claimed in claim 1, wherein the tune away gap further comprises a time duration for which the multi-SIM user device switches from a second Radio Access Technology (RAT) network of the second SIM to a first RAT network of the first SIM.

3. The method as claimed in claim 1, wherein the detecting, via the detection unit, the at least one tune away gap is further based on:
   an event the at least one uplink SINR value of the second SIM is greater than the pre-determined decision-making threshold value, and
   at least one of a periodic detection of the at least one tune away gap and an aperiodic detection of the at least one tune away gap.

4. The method as claimed in claim 3, wherein the at least one periodic detection further comprises determining at least one of at least one tune-away gap periodicity and at least one tune away gap duration associated with the second SIM, based on at least one of:
   at least one tune away pattern of the second SIM,
   at least one paging cycle of the first SIM, and
   at least one Home Public Land Mobile Network (HPLMN) Selection via the first SIM.

5. The method as claimed in claim 4, the method further comprising adjusting, via the scheduler unit [306], the at least one PDSCH resource allocation of the second SIM based on at least one of a Tune-Away—Idle Mode Paging Parameter Set and a Tune-Away—HPLMN Selection Parameter Set.

6. The method as claimed in claim 1, wherein the second event comprises detecting at least one hybrid automatic repeat request acknowledgement/negative-acknowledgement (HARQ ACK/NACK) on an uplink data transmission channel corresponding to the single PRB scheduled in the downlink data transmission to the second SIM.

7. A system for managing resource allocation in a multi-SIM user device comprising at least a first subscriber identity module (SIM) and a second subscriber identity module (SIM), the system comprising a processor and a memory storing instructions, which when executed by the processor, cause the system to:
   identify in physical downlink shared channel (PDSCH), at least one discontinuous transmission (DTX) event associated with the second SIM of the multi-SIM user device;
   detect, at least one tune away gap based on the identified at least one discontinuous transmission (DTX) event and a comparison of at least one uplink signal-to-interference-plus-noise ratio (SINR) value of the second SIM with a pre-determined decision-making threshold value;
   adjust, at least one PDSCH resource allocation of the second SIM, wherein to adjust, the at least one PDSCH resource allocation the processor is further configured to restrict the at least one PDSCH resource allocation of the second SIM, wherein the processor is further configured to schedule a single physical resource block (PRB) to each of the at least one PDSCH resource allocation in downlink data transmission to the second SIM, wherein the single physical resource block (PRB) is scheduled based on the restricting the at least one PDSCH resource allocation of the second SIM;
   detect, one of a first event and a second event in response to said adjustment of the at least one PDSCH resource allocation; and
   wherein, the processor is further configured to resume the at least one PDSCH resource allocation of the second SIM based on the detection of the one of the first event and the second event.

8. The system as claimed in claim 7, wherein the tune away gap further comprises a time duration for which the multi-SIM user device switches from a second Radio Access Technology (RAT) network of the second SIM to a first RAT network of the first SIM.

9. The system as claimed in claim 7, wherein the processor is further configured to detect, the at least one tune away gap, based on:
   an event the at least one uplink SINR value of the second SIM is greater than the pre-determined decision-making threshold value, and
   at least one of a periodic detection of the at least one tune away gap, and an aperiodic detection of the at least one tune away gap.

10. The system as claimed in claim 9, wherein the at least one periodic detection further comprises determining at least one of at least one tune-away gap periodicity and at least one tune away gap duration associated with the second SIM, based on at least one of:
   at least one tune away pattern of the second SIM,
   at least one paging cycle of the first SIM, and
   at least one Home Public Land Mobile Network (HPLMN) Selection via the first SIM.

11. The system as claimed in claim 10, wherein the processor is further configured to adjust the at least one PDSCH resource allocation of the second SIM based on at least one of a Tune-Away—Idle Mode Paging Parameter Set and a Tune-Away—HPLMN Selection Parameter Set.

12. The system as claimed in claim 7, wherein in the event of the second event, the processor is further configured to detect at least one hybrid automatic repeat request acknowledgement/negative-acknowledgement (HARQ ACK/NACK) on an uplink data transmission channel corresponding to the single PRB scheduled in the downlink data transmission to the second SIM.

13. A base station for managing resource allocation in a multi-SIM user device comprising at least a first subscriber identity module (SIM) and a second subscriber identity module (SIM), the base station comprising a processor and a memory storing instructions, which when executed by the processor, cause the base station to:
   identify in physical downlink shared channel (PDSCH), at least one discontinuous transmission (DTX) event associated with the second SIM of the multi-SIM user device;
   detect, at least one tune away gap based on the identified at least one discontinuous transmission (DTX) event and a comparison of at least one uplink signal-to-interference-plus-noise ratio (SINR) value of the second SIM with a pre-determined decision-making threshold value;
   adjust, at least one PDSCH resource allocation of the second SIM, wherein to adjust, the at least one PDSCH resource allocation the processor is further configured to restrict the at least one PDSCH resource allocation of the second SIM, wherein the processor is further configured to schedule a single physical resource block (PRB) to each of the at least one PDSCH resource allocation in downlink data transmission to the second SIM, wherein the single physical resource block (PRB) is scheduled based on the restricting the at least one PDSCH resource allocation of the second SIM;
   detect, one of a first event and a second event in response to said adjustment of the at least one PDSCH resource allocation; and
   wherein, the processor is further configured to resume the at least one PDSCH resource allocation of the second SIM based on the detection of the one of the first event and the second event.

\* \* \* \* \*